US012589604B2

(12) United States Patent
Iwano

(10) Patent No.: US 12,589,604 B2
(45) Date of Patent: Mar. 31, 2026

(54) LIQUID EJECTION HEAD, METHOD OF DETACHING PROTECTION MEMBER FROM LIQUID EJECTION HEAD, AND LIQUID EJECTION APPARATUS

(71) Applicant: CANON KABUSHIKI KAISHA, Tokyo (JP)

(72) Inventor: Takuya Iwano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 71 days.

(21) Appl. No.: 18/526,238

(22) Filed: Dec. 1, 2023

(65) Prior Publication Data

US 2024/0181779 A1 Jun. 6, 2024

(30) Foreign Application Priority Data

Dec. 2, 2022 (JP) ................................ 2022-193591

(51) Int. Cl.

| | |
|---|---|
| ***B41J 29/12*** | (2006.01) |
| ***B41J 2/155*** | (2006.01) |
| ***B41J 2/165*** | (2006.01) |
| ***B41J 29/13*** | (2006.01) |

(52) U.S. Cl.

CPC ........... *B41J 29/12* (2013.01); *B41J 2/16502* (2024.05); *B41J 2/16508* (2013.01); *B41J 2/16585* (2013.01); *B41J 29/13* (2013.01); *B41J 2/155* (2013.01); *B41J 2202/20* (2013.01); *B41J 2202/21* (2013.01)

(58) Field of Classification Search

CPC .... B41J 29/12; B41J 2/16502; B41J 2/16508; B41J 2/16585; B41J 29/13; B41J 2/155; B41J 2202/20; B41J 2202/21

See application file for complete search history.

(56) References Cited

U.S. PATENT DOCUMENTS

| | | | | |
|---|---|---|---|---|
| 10,384,457 | B2 * | 8/2019 | Tsuji .................... | B41J 2/16511 |
| 10,618,327 | B2 | 4/2020 | Iwano et al. | |
| 2007/0109350 | A1 * | 5/2007 | Izawa ...................... | B41J 29/02 347/37 |

FOREIGN PATENT DOCUMENTS

| | | | | |
|---|---|---|---|---|
| JP | 2001063080 A * | 3/2001 | ............. | B41J 2/175 |
| JP | 2019-014169 A | 1/2019 | | |

* cited by examiner

*Primary Examiner* — Geoffrey S Mruk

(74) *Attorney, Agent, or Firm* — Venable LLP

(57) ABSTRACT

A liquid ejection head including a detachable protection member, includes: a rail portion extending along a first direction; a rail opening formed in the rail portion; and a fixing opening fixing the protection member, in which the protection member includes a protection portion covering an ejection surface of the liquid ejection head, an engagement portion that has a shorter length in the first direction than that of the rail opening, and a fixing portion that is engaged with the fixing opening and that fixes the liquid ejection head and the protection member, the rail portion includes a contact portion at one end in the first direction with which the engagement portion is put in contact, and the other end on an opposite side of the one end in the first direction is connected with the rail opening while the liquid ejection head and the protection member are fixed.

11 Claims, 7 Drawing Sheets

LIQUID EJECTION HEAD, METHOD OF DETACHING PROTECTION MEMBER FROM LIQUID EJECTION HEAD, AND LIQUID EJECTION APPARATUS

BACKGROUND OF THE INVENTION

Field of the Invention

The present disclosure relates to a liquid ejection head on board a liquid ejection apparatus.

Description of the Related Art

There has been known a page-wide type liquid ejection apparatus that performs a printing operation by using a liquid ejection head with a size corresponding to a width of a subject medium. In the page-wide type liquid ejection head, a print chip (an ejection module) forming a nozzle that ejects a liquid is arranged over an entire width of the subject medium.

In a case of the transportation of the liquid ejection head, a protection member covering an entire surface of the print chip is usually used in order to prevent damage and contamination of the above-described print chip. In Japanese Patent Laid-Open No. 2019-014169 (hereinafter, referred to as PTL 1), a configuration in which the protection member covering the entire surface of the print chip of the page-wide type liquid ejection head is engaged with a rail portion over an entire area in a longitudinal direction, and the protection member can be detached from the liquid ejection head by being slid along the longitudinal direction is applied.

The configuration of attaching and detaching the enlarged liquid ejection head such as the page-wide type to and from a main body of the liquid ejection apparatus includes a configuration in which the liquid ejection head is replaced while a slot on which the liquid ejection head is mounted is drawn out. In the configuration as described in PTL 1, a stroke to slide the protection member is necessary in addition to a stroke to draw out the liquid ejection head mounting slot; for this reason, a large space is required to attach and detach the liquid ejection head.

SUMMARY OF THE INVENTION

The present disclosure relates to a liquid ejection head including a detachable protection member, including: a rail portion extending along a first direction; a rail opening formed in the rail portion; and a fixing opening fixing the protection member, in which the protection member includes a protection portion covering an ejection surface of the liquid ejection head, an engagement portion that can be engaged with the rail portion and that has a shorter length in the first direction than that of the rail opening, and a fixing portion that is engaged with the fixing opening in an engagement position in which the rail portion and the engagement portion are engaged with each other and that fixes the liquid ejection head and the protection member so as to regulate movement of the protection member with respect to the liquid ejection head in the first direction, the rail portion includes a contact portion at one end in the first direction with which the engagement portion is put in contact, and the other end on an opposite side of the one end in the first direction is connected with the rail opening while the liquid ejection head and the protection member are fixed.

Further features of the present invention will become apparent from the following description of exemplary embodiments with reference to the attached drawings.

DESCRIPTION OF THE EMBODIMENTS

An example of embodiments of the present disclosure is described below with reference to the drawings.

(Liquid Ejection Apparatus)

Figure 1:
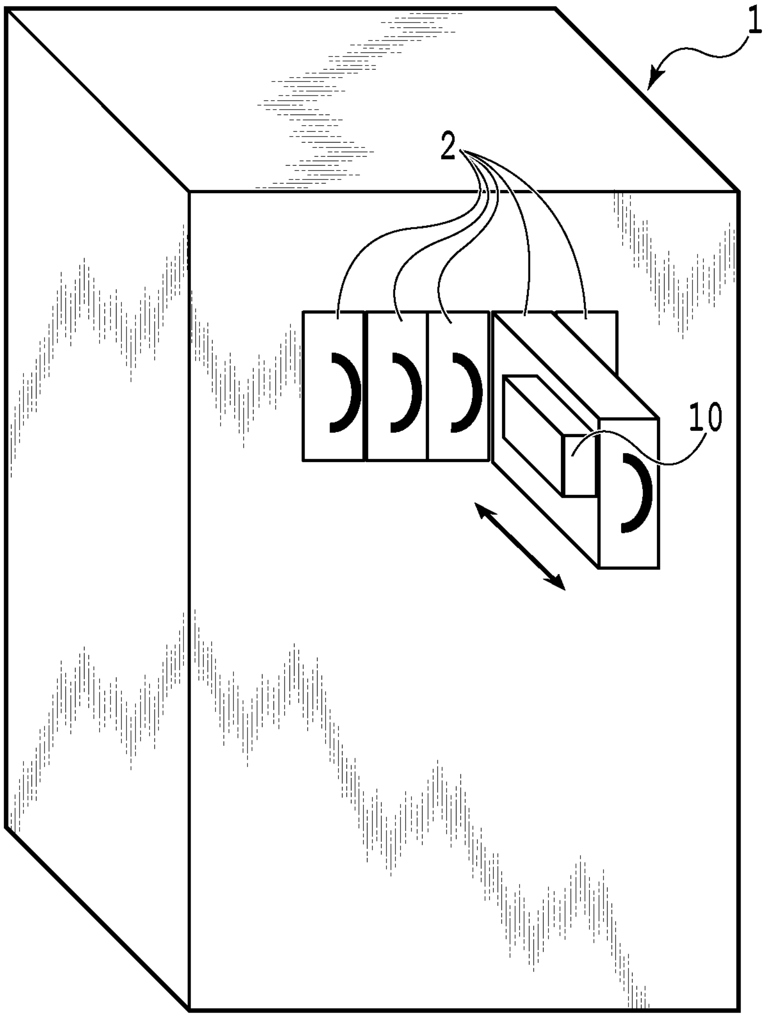
FIG. 1 is a perspective view illustrating a configuration of a liquid ejection apparatus according to the present disclosure.

FIG. 1 is a perspective view illustrating a configuration of a liquid ejection apparatus 1 according to an embodiment of the present disclosure. The liquid ejection apparatus 1 includes a liquid ejection head 10 that ejects a liquid (hereinafter, also referred to as a head) and a head mounting unit 2 in which the head 10 can be on board. In the present embodiment, a case where the head 10 is taken out from the liquid ejection apparatus 1 by drawing out the head mounting unit 2 to perform a replacement work is described as an example.

Additionally, in the present embodiment, heads to eject inks of black (Bk), cyan (C), magenta (M), and yellow (Y) are included as the head 10. The heads are apposed along a conveyance direction of a medium (a second direction). Note that, the number of colors, that is, the number of heads can be determined as desired, arbitrarily, and the heads are comprehensively referred to simply as "head 10" below.

Figure 2:
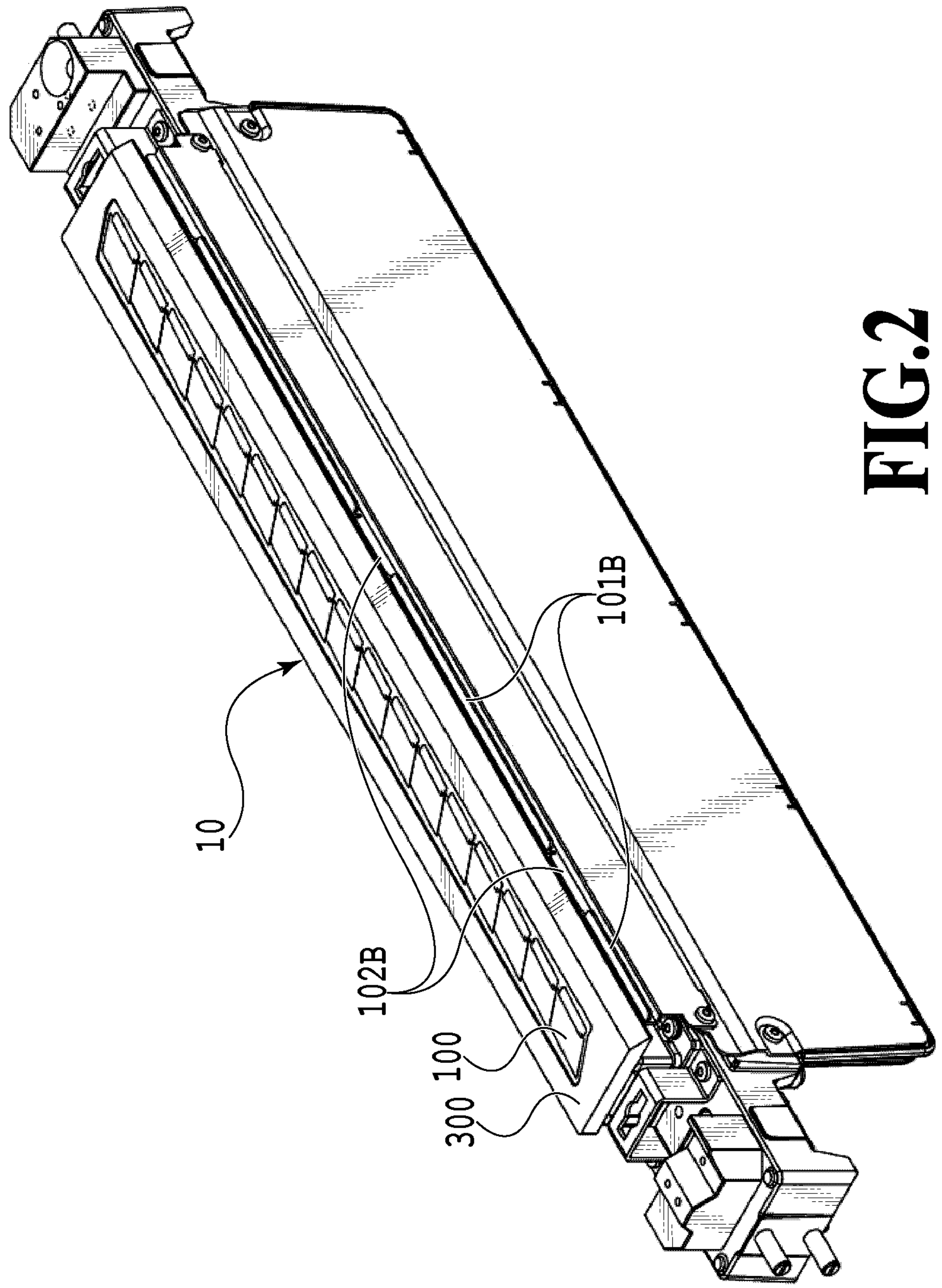
FIG. 2 is a perspective view of a liquid ejection head according to the present disclosure that is viewed from below.
Figure 3:
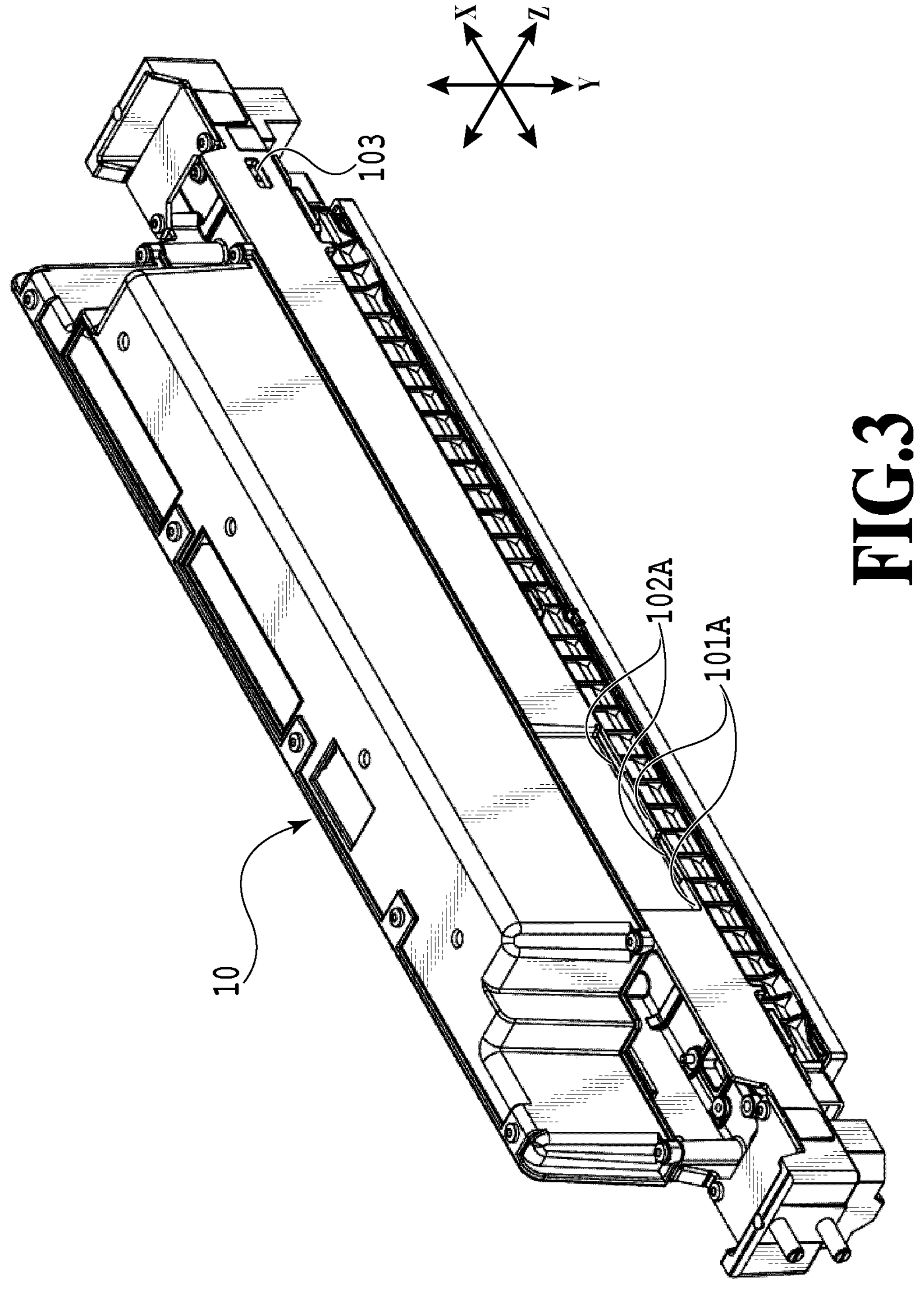
FIG. 3 is a perspective view of the liquid ejection head according to the present disclosure that is viewed from above.
Figure 4:
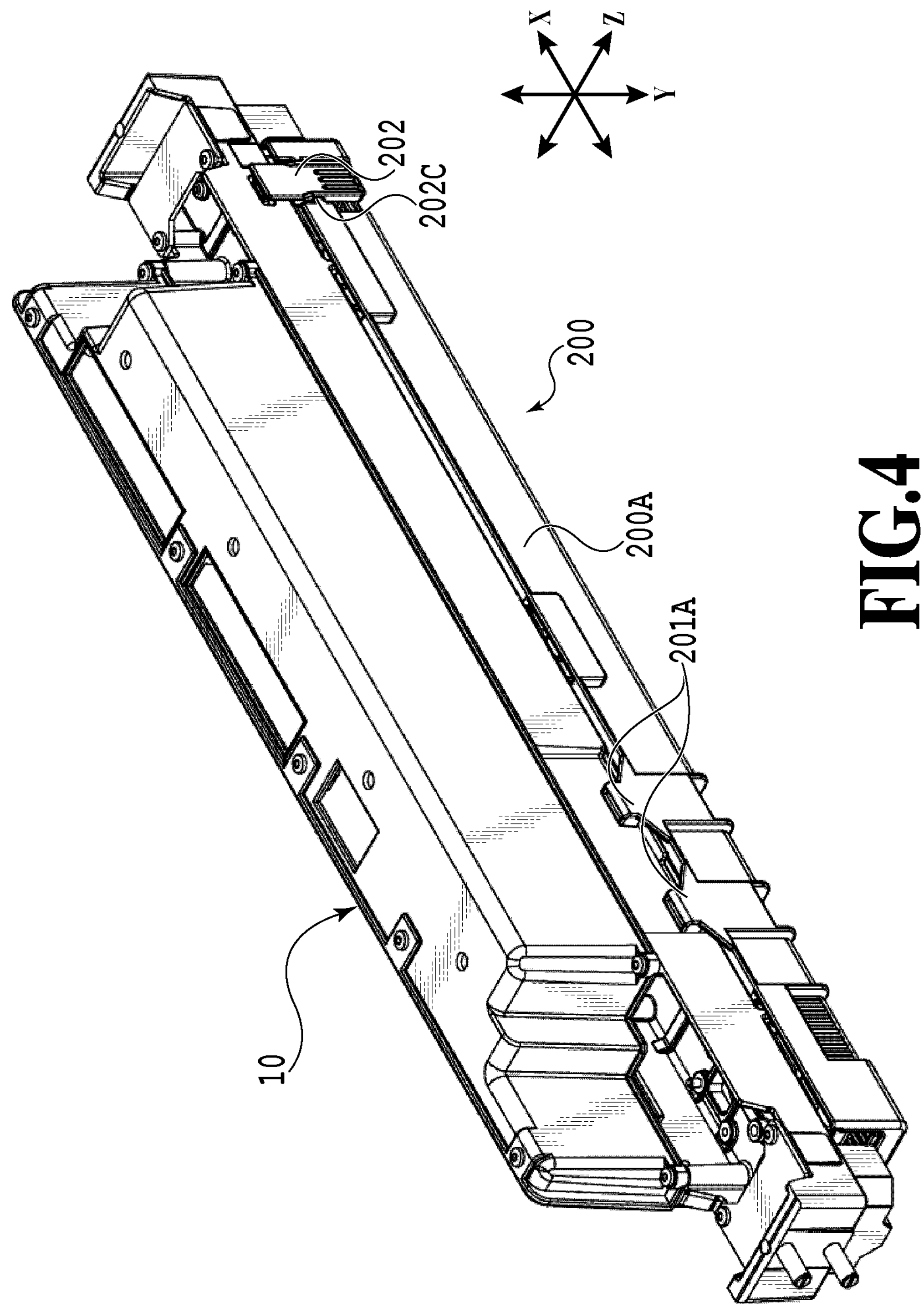
FIG. 4 is a perspective view of the liquid ejection head according to the present disclosure to which a protection member is attached.

FIG. 2 is a perspective view of the head 10 of the present disclosure that is viewed from below, and FIG. 3 is a perspective view of the head 10 of the present disclosure that is viewed from above. Additionally, FIG. 4 is a perspective view of a state in which a protection member 200 is attached to the head 10. Positions in which the head 10 is mounted on the head mounting unit 2 and in which the protection member 200 is detached after the mounting are described; details are described later. The position in which the protection member 200 is attached to the head 10 is an engagement position, and the position in which engagement portions 201A and 201B of the protection member 200 are at positions of rail openings 102A and 102B of the head 10 is a disengagement position.

(Liquid Ejection Head)

As illustrated in FIG. 2, an ejection surface is formed on the head 10 of the present disclosure, and multiple element substrates 100, which eject the liquid, are arrayed in a long-length direction (a first direction X) on the ejection surface. Additionally, a cap surface formation member 300 is formed on the ejection surface of the head 10 of the present disclosure so as to surround the multiple element substrates 100. Moreover, the head 10 includes the detachable protection member 200, at least one rail portion extending along the first direction X, at least one rail opening formed in at least one rail portion, and a fixing opening to fix the protection member. In the present embodiment, the head 10 includes two rail portions 101A and 101B, two rail openings 102A and 102B, and a fixing opening 103 so as to attach the protection member 200 (see FIG. 3). In the present embodiment, the two rail portions and the two rail openings are each formed in the head 10; however, it is not limited thereto, and the number of the formed rail portions and the rail openings may be one or may be three or more, respectively.

The rail portions 101A and 101B of the head 10 each include a contact portion at one end in the first direction X with which the engagement portion 201A of the later-described protection member 200 is put in contact. Additionally, while the head 10 and the protection member are fixed, the other end of each of the rail portions 101A and 101B, which is on the opposite side of the one end in the first direction, is put in contact with each of the rail openings 102A and 102B of the head 10.

A length of the rail portions 101A and 101B of the head 10 may be equal to or shorter than a length from an end portion of the protection member 200 in the first direction X to the head mounting unit 2 while the head 10 is kept mounted on the head mounting unit 2. Preferably, the length of the rail portions 101A and 101B of the head 10 is the same as the length from the end portion of the protection member 200 in the first direction X to the head mounting unit 2. Additionally, the length of the rail opening of the head 10 may be equal to or longer than a length of the engagement portion of the protection member. Preferably, the length of the rail opening of the head 10 is the same as the length of the engagement portion of the protection member. Thus, it is possible to attach and detach the protection member 200 without interfering with the head mounting unit 2 while keeping the head 10 mounted on the head mounting unit 2.

(Protection Member)

The protection member 200 functions to suppress damage and contamination of the element substrates and the like in use and during distribution of the head 10. It is possible to suppress breakage and contamination of the head in a replacement work by attaching the head 10 to the head mounting unit 2 of the liquid ejection apparatus 1 while keeping the protection member 200 attached to the head 10, and detaching the protection member 200 thereafter.

The protection member 200 includes a protection portion 200A covering the ejection surface of the head 10 and multiple engagement portions that can be engaged with at least one rail portion of the head 10 and that have a shorter length in the first direction X than that of at least one rail opening. Additionally, the protection member 200 is engaged with the fixing opening 103 of the head 10 in the engagement position in which at least one of the rail portions 101A and 101B of the head 10 and the multiple engagement portions 201A and 201B are engaged with each other. Moreover, the protection member 200 regulates the movement of the protection member 200 in the first direction X to the head 10 in the engagement position in which at least one of the rail portions 101A and 101B of the head 10 and the multiple engagement portions 201A and 201B are engaged with each other. Furthermore, the protection member 200 includes at least one fixing portion 202 that fixes the head 10 and the protection member 200.

In the present embodiment, the protection member 200 includes the two engagement portions 201A and 201B and the fixing portion 202 that is arranged in a third direction Z crossing the first direction X and a second direction Y. Note that, in the present embodiment, a direction crossing the first direction X on a plane is the third direction Z, and a vertical direction is the second direction Y.

The fixing portion 202 has a deformable shape and can move with respect to the head 10 from a fixing position in which the fixing portion 202 is engaged with the fixing opening 103 and fixed to a fixing release position in which the fixing is released. In the present embodiment, the fixing portion 202 includes a protrusion portion 202A (see FIGS. 6A and 6C) on an upper side and a disengagement portion 202B (see FIGS. 6A and 6C) on a lower side and is attached so as to be pivotable (rotatable) in a top and bottom direction. The fixing portion 202 is formed as a part integral with the protection member 200 and is supported by a rotational shaft 202C (see FIG. 4 and the like). The fixing portion 202 may be formed of a resin member such as polypropylene. In the present embodiment, the fixing portion 202 is formed as a part integral with the protection member 200; however, it is not limited thereto, and the fixing portion 202 may be formed as a separate part from the protection member 200. In this case, the fixing portion 202 may be formed of resin, metal, or the like containing a filler. Additionally, the shape of the fixing portion may be any shape as long as the shape allows the protection member and the head to be fixed, and the fixing portion may be formed of an extendable member in which a tip is provided with the protrusion portion, which is engaged with the opening of the head to achieve the fixing.

The protection member 200 is attached to the head 10, with a pair of the rail portion 101A and the engagement portion 201A and a pair of the rail portion 101B and the engagement portion 201B being engaged with each other, respectively, and with the fixing opening 103 and the fixing portion 202 being fixed (see FIG. 4). In the present embodiment, the fixing opening 103 and the fixing portion 202 are formed at the end portions of the head 10 and the protection member 200, respectively; however, it is not limited thereto, and any position may be applicable as long as it is a position in which the fixing portion 202 and the fixing opening 103 can be engaged or disengaged.

(Method of Detaching Protection Member)

Here is described a method of detaching the protection member 200 after the head 10 including the protection member 200 is mounted on the head mounting unit 2. Note that, the head mounting unit 2 is not illustrated.

Figure 5A:
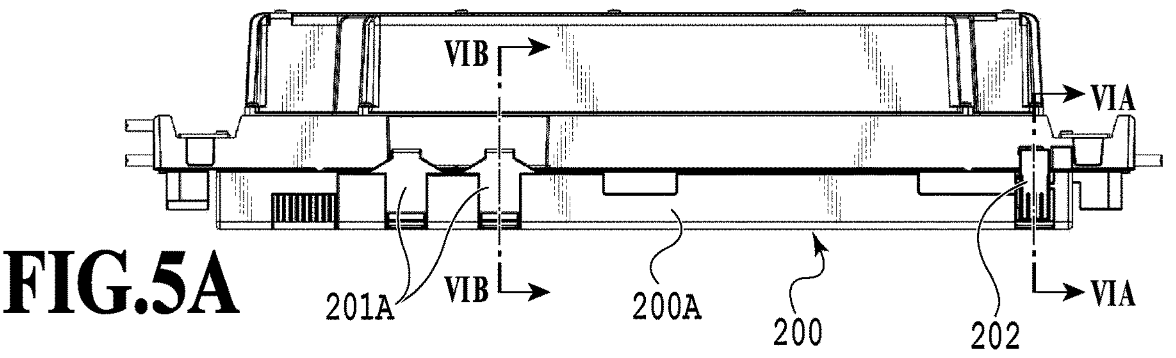
FIGS. 5A to 5D are explanatory views illustrating a procedure of detaching the protection member from the liquid ejection head according to the present disclosure.
Figure 5B:
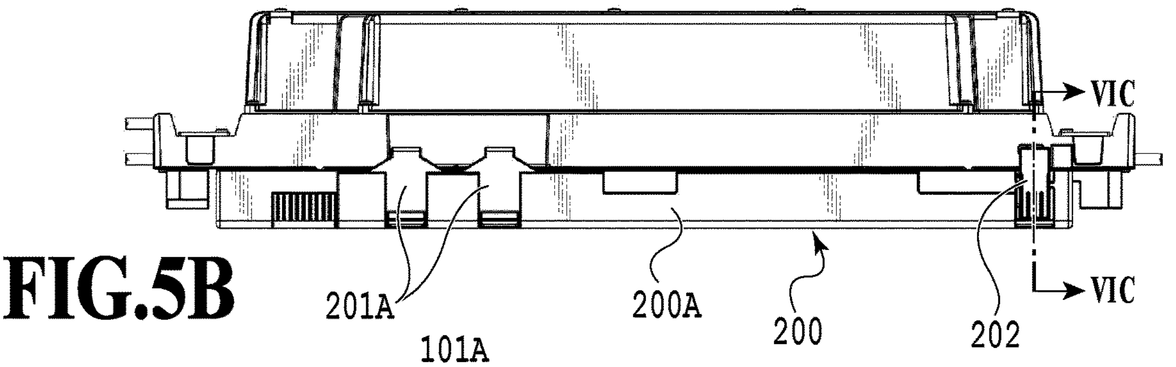
Figure 5C:
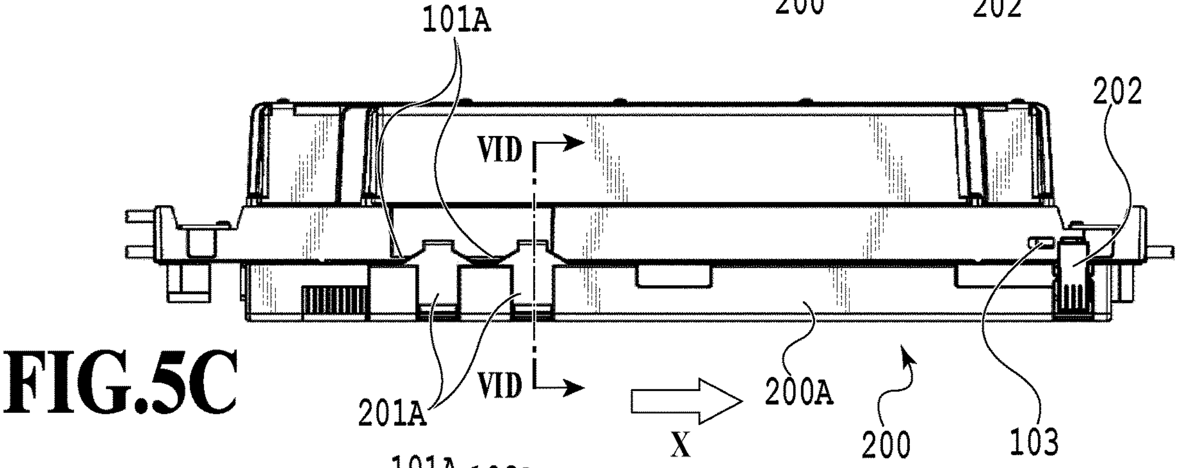
Figure 5D:
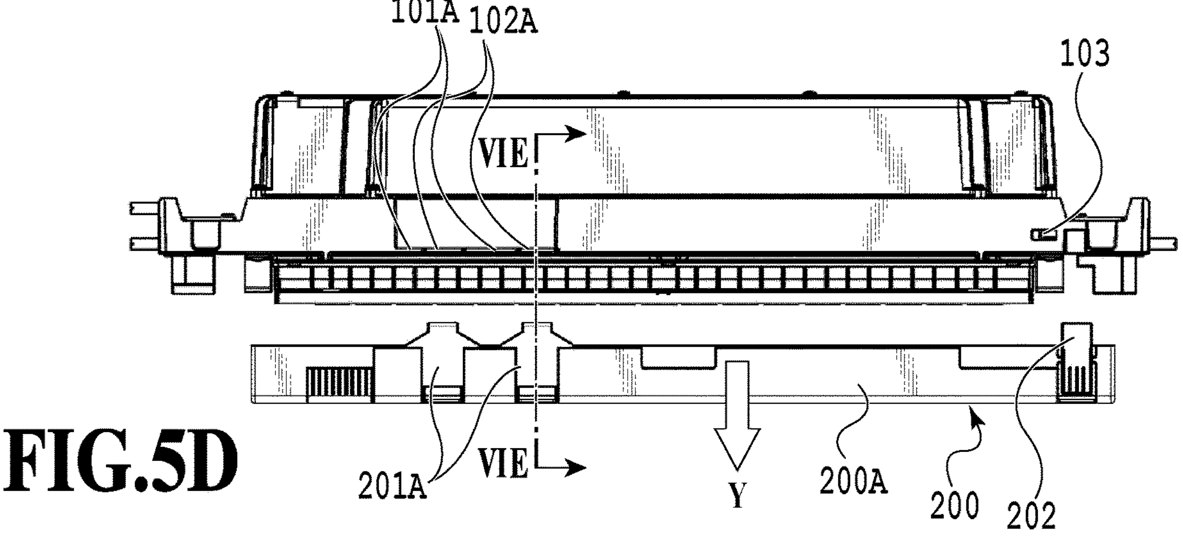

FIGS. 5A to 5D are explanatory views illustrating a procedure of detaching the protection member from the liquid ejection head in the embodiment of the present disclosure. FIG. 5A is a side view of a state in which the protection member 200 is attached to the head 10, and FIG. 5B is a side view of a state in which the fixing opening 103 of the head 10 and the fixing portion 202 of the protection member 200 are disengaged from each other. Additionally, FIG. 5C is a side view of a state in which the protection member 200 is slid and moved in the first direction X with respect to the head 10, and FIG. 5D is a side view of a state in which the protection member 200 is moved in the second direction Y with respect to the head 10.

The procedure of detaching the protection member 200 from the head 10 is described with reference to FIGS. 5A to 5D. In the head 10, the rail portions 101A and 101B are formed such that the protection member 200 can be slid in the first direction X (the longitudinal direction of the head), and in the protection member 200, the engagement portions 201A and 201B are formed so as to be engaged with the rail portions 101A and 101B. Additionally, the fixing portion 202 is provided to the protection member 200, which is fixed with the protrusion portion 202A being engaged with the fixing opening 103, and the movement in the first direction X is regulated (FIG. 5A). With the movement (pivoting) of the disengagement portion 202B of the fixing portion 202 caused by a user operation, the protrusion portion 202A is moved (pivoted). With the movement (pivoting) of the protrusion portion 202A, the fixing opening 103 and the protrusion portion 202A are disengaged from each other. Thus, the protection member 200 has a configuration that allows for the movement in the first direction X.

The fixing portion 202 is disengaged from the fixing opening 103 by a user operation, and the protection member 200 is moved by a predetermined amount in the first direction X from the engagement position to be moved to the disengagement position in which the rail portions 101A and 101B and the engagement portions 201A and 201B are disengaged from each other. The protection member 200 is detached from the head 10 by moving the protection member 200 in the second direction Y crossing the first direction X.

A specific description is provided below with reference to FIG. 5. As illustrated in FIG. 5A, the head 10 and the protection member 200 are in the engagement position in which they are engaged with each other. Then, in a case where the protection member 200 is detached from the head 10, the fixing portion 202 is moved with respect to the head 10, and the fixing portion 202 and the fixing opening 103 are disengaged from each other (see FIG. 5B). Next, the protection member 200 is moved in the first direction X along the rail portion 101 to be moved to the disengagement position (see FIG. 5C). Then, the rail portion 101A and the engagement portion 201A, which engage the protection member 200 and the head 10 with each other, are disengaged in this state, the movement in the second direction Y crossing the first direction X is allowed, and the protection member 200 can be detached from the head 10 (see FIG. 5D).

Figures 6A, 6B, 6C, 6D, 6E:
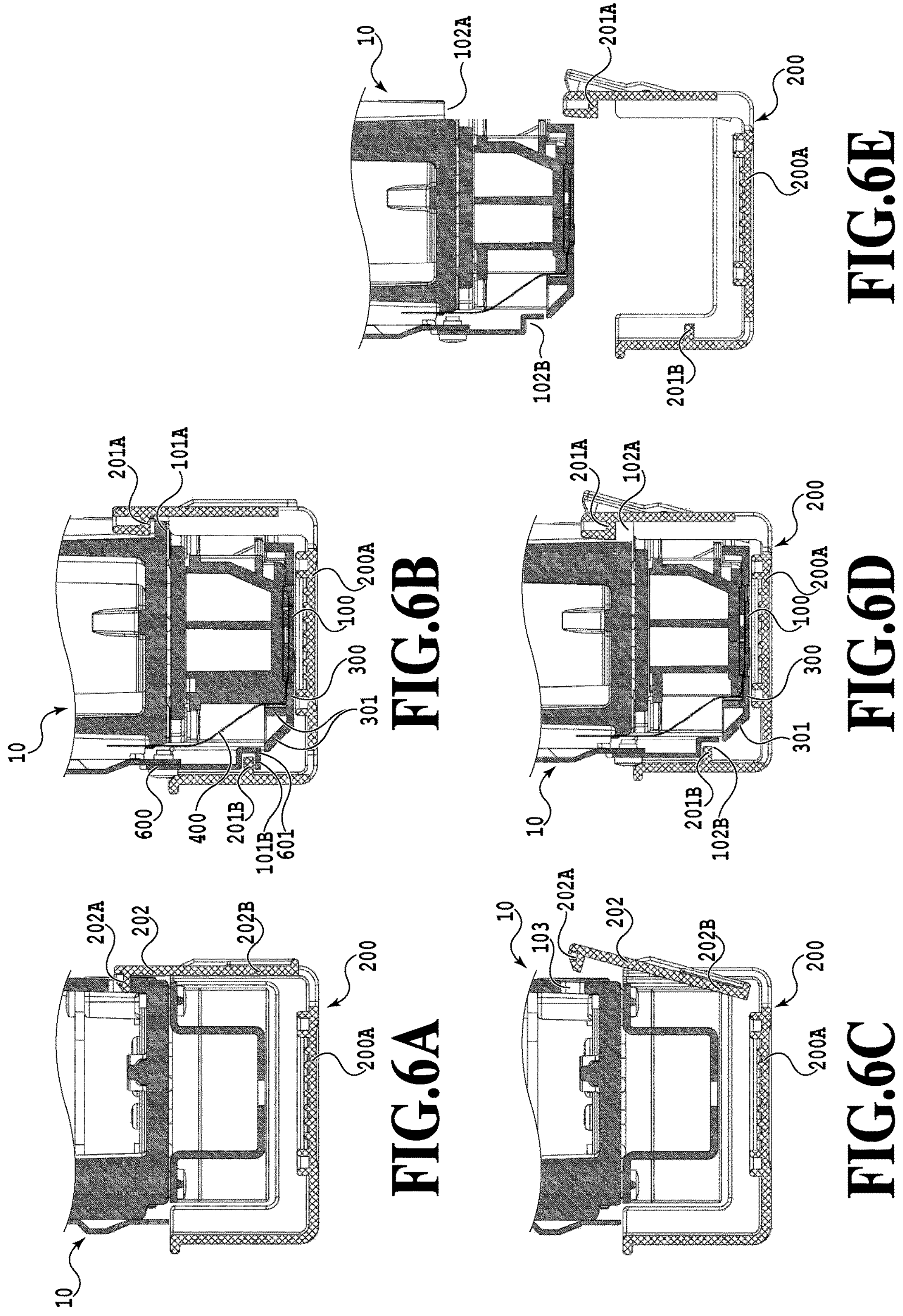
FIGS. 6A to 6E are explanatory views illustrating the procedure of detaching the protection member from the liquid ejection head according to the present disclosure.

A further specific description is provided below about the configuration of the protection member 200 and the head 10 with reference to FIGS. 6A to 6E. FIG. 6A is a cross-sectional view of the head 10 taken along VIA-VIA in FIG. 5A, and FIG. 6B is a cross-sectional view of the head 10 taken along VIB-VIB in FIG. 5A. Additionally, FIG. 6C is a cross-sectional view of a state in which the fixing portion of the head 10 is deformed that is taken along VIC-VIC in FIG. 5B, FIG. 6D is a cross-sectional view of the head 10 taken along VID-VID in FIG. 5C, and FIG. 6E is a cross-sectional view of the head 10 taken along VIE-VIE in FIG. 5D.

As illustrated in FIG. 6A, the fixing portion 202 of the protection member 200 is engaged with the fixing opening 103 of the head 10, and thus the movement of the protection member 200 in the longitudinal direction is regulated. Additionally, as illustrated in FIG. 6B, the protection member 200 has a shape covering an entire surface of the element substrate 100 and includes the engagement portions 201A and 201B on transverse two side surfaces, respectively. On the other hand, the head 10 includes the rail portions 101A and 101B facing and engaged with the engagement portions 201A and 201B, respectively. With the engagement of the rail portions 101A and 101B and the engagement portions 201A and 201B, respectively, the movement in the second direction Y is regulated, and the protection member 200 can be slid in the first direction X.

In a case where the protection member 200 is detached from the head 10, first, as illustrated in FIG. 6C, the fixing opening 103 of the head 10 is disengaged from the fixing portion 202 by a user operation. Thus, the protection member 200 can be moved with respect to the head 10 in the first direction X. Next, the protection member 200 is slid and moved in the first direction X by a user operation. In this process, as illustrated in FIG. 6D, the user moves the protection member 200 to a position in which the engagement portions 201A and 201B of the protection member 200 and the rail openings 102A and 102B of the head 10 are overlapped with each other, respectively. Thus, it is possible to detach the protection member 200 from the head 10 with own weight. Finally, as illustrated in FIGS. 5C and 6E, with the detachment of the protection member 200 from the head 10 with own weight, the detachment of the protection member 200 is completed.

Each element substrate 100 is electrically connected with an electric wiring substrate (not illustrated) through a flexible wiring substrate 400. Additionally, entire surfaces of the flexible wiring substrate 400 and an electric wiring substrate 500 are covered with a metallic cover member 600. The engagement portion 201B forms a U-shape with a rail member being assembled to this metallic cover member 600. The metallic cover member 600 is ground-connected with each electric part and is earth-connected in a case where the head 10 is mounted on the liquid ejection apparatus 1. With the present configuration, it is possible to prevent electrostatic destruction of the element substrate 100 and the like caused by static electricity generated because the user uses the head by hand or the shaking during distribution, and to mitigate a noise effect in high-speed signal transmission. In the present embodiment, a part of the rail portion 101A and the rail portion 101B is formed of a metallic member and is electrically connected with the above-described metallic cover member 600. With the present configuration, it is possible to release the static electricity generated from the rubbing of the rail portion in a case of sliding and attaching or detaching the protection member 200 to the metallic cover member 600 with a greater electrostatic capacitance. Thus, it is possible to prevent the electrostatic destruction of the element substrate 100 in a case of attaching and detaching the protection member 200. At least a part of the protection member 200, the rail portions 101A and 101B, and the engagement portions 201A and 201B is desirably a metallic member; however, in a case of using a resin material, it is desirable to use conductive resin, more preferably antistatic resin. Additionally, in the present embodiment, the rail portions 101A and 101B are formed of separate members; however, the rail portions 101A and 101B may be formed as an integral metallic member.

The cap surface formation member 300 forming a surface with which a suction recovery cap can suck bubbles in a flow channel is arranged around the element substrate 100. In a case where the protection member 200 is formed of a resin material, for example, there is a possibility that the protection member 200 is deformed by an impact of a fall of the head and the like and interferes with the cap surface formation member 300, and this breaks the cap surface formation member 300. The breakage of the cap surface formation member 300 is likely to occur particularly in a place in which a surface facing a portion with which the protection member 200 interferes has a space (there is no support member), which is like a side surface portion 301 of the cap surface formation member 300, for example. In the present embodiment, a configuration in which the metallic cover member 600 and the rail member support the side surface portion 301 of this cap surface formation member 300 by a support portion 601 is applied. Thus, it is possible to prevent the breakage of the cap surface formation member 300 caused by the interference of the protection member 200 in the fall of the head.

(Modification of Protection Member)

Figure 7:
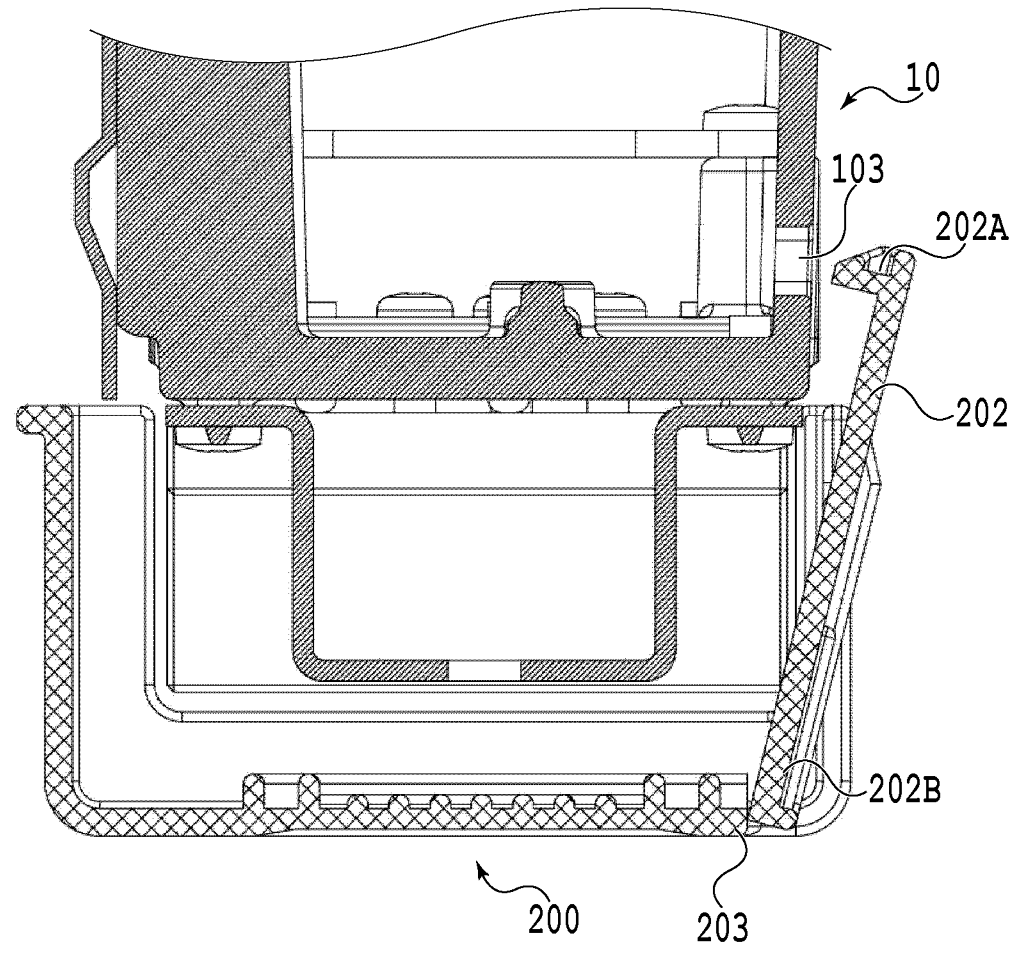
FIG. 7 is a cross-sectional view illustrating the liquid ejection head according to the present disclosure and a modification of the protection member.

In the present embodiment, the fixing portion 202 of the protection member 200 is arranged on only one side surface in the third direction Z (a transverse direction of the head) crossing both the first direction X and second direction Y; however, the fixing portion 202 may be arranged on each of two side surfaces, or multiple fixing portions 202 may be arranged on each of the two side surfaces. Additionally, in the present embodiment, a configuration in which the fixing portion arranged on the protection member side is deformed is described; however, it is not limited thereto as long as it is a configuration in which the movement of the protection member in the first direction can be regulated. For example, the fixing portion may be arranged on the head side, and the engagement direction and the deformation direction may be in the first or second direction, for example. Moreover, there is a possibility that the excessive deformation may break the fixing portion. To solve this, there is a method of providing a regulation portion 203 illustrated in FIG. 7. Since the fixing portion 202 interferes with the regulation portion 203 in a case where the fixing portion 202 is disengaged from the head 10, it is possible to prevent a predetermined amount or more of the deformation of the fixing portion 202, and it is possible to prevent the breakage. In the present example, an example in which the regulation portion 203 is formed on the protection member 200 is described; however, it is not limited thereto, and the regulation portion 203 may be formed on the head 10, for example.

Although the present embodiment describes a line-head that is a page-wide type liquid ejection head, the present embodiment is also applicable to a serial scanning type liquid ejection head, not limited to the page-wide type.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-193591, filed Dec. 2, 2022, which is hereby incorporated by reference herein in its entirety.

What is claimed is:

1. A liquid ejection head including a detachable protection member, comprising:

a rail portion extending along a first direction;

a rail opening formed in the rail portion; and a fixing opening fixing the protection member, wherein the protection member includes:

a protection portion covering an ejection surface of the liquid ejection head, an engagement portion that can be engaged with the rail portion and that has a shorter length in the first direction than that of the rail opening, and a fixing portion that is engaged with the fixing opening in an engagement position in which the rail portion and the engagement portion are engaged with each other and that fixes the liquid ejection head and the protection member so as to regulate movement of the protection member with respect to the liquid ejection head in the first direction, the rail portion includes a contact portion at one end in the first direction with which the engagement portion is put in contact, and the other end on an opposite side of the one end in the first direction is connected with the rail opening while the liquid ejection head and the protection member are fixed.

2. The liquid ejection head according to claim 1, wherein the fixing portion is disengaged from the fixing opening, and the protection member is detached from the liquid ejection head by being moved by a predetermined amount in the first direction from the engagement position to be moved to a disengagement position in which the rail portion and the engagement portion are disengaged from each other and moved in a second direction crossing the first direction.

3. The liquid ejection head according to claim 2, wherein the fixing portion is arranged on only at least one side surface in a third direction crossing the first direction and the second direction.

4. The liquid ejection head according to claim 2, wherein the fixing portion has a deformable shape in the case that the protection member is moved from the engagement position to the disengagement position, and the protection portion includes a regulation portion that regulates deformation of the fixing portion.

5. The liquid ejection head according to claim 1, wherein the liquid ejection head is a line-head in which a plurality of element substrates are arrayed in the first direction on the ejection surface.

6. The liquid ejection head according to claim 1, wherein at least a part of the rail portion is formed of a metallic member, and the metallic member is earth-connected.

7. The liquid ejection head according to claim 1, wherein the protection member includes an conductive resin.

8. The liquid ejection head according to claim 1, wherein the liquid ejection head includes one or more wiring substrates, a flexible wiring substrate electrically connecting the wiring substrates and a plurality of element substrates, and a metallic member covering entire surfaces of the one or more wiring substrates and the flexible wiring substrate.

9. The liquid ejection head according to claim 8, wherein the engagement portion is attached to the metallic member and forms a rail shape to slide the protection member.

10. A liquid ejection apparatus, comprising:

a liquid ejection head including a detachable protection member, wherein the liquid ejection head includes:

a rail portion extending along a first direction, a rail opening formed in the rail portion, and a fixing opening fixing the protection member, the protection member includes a protection portion covering an ejection surface of the liquid ejection head, an engagement portion that can be engaged with the rail portion and that has a shorter length in the first direction than that of the rail opening, and a fixing portion that is engaged with the fixing opening in an engagement position in which the rail portion and the engagement portion are engaged with each other and that fixes the liquid ejection head and the protection member so as to regulate movement of the protection member with respect to the liquid ejection head in the first direction, the rail portion includes a contact portion at one end in the first direction with which the engagement portion is put in contact, the other end on an opposite side of the one end in the first direction is connected with the rail opening while the liquid ejection head and the protection member are fixed, and the liquid ejection apparatus includes:

the liquid ejection head from which the protection member is detached, and a liquid ejection head mounting unit that detachably mounts the liquid ejection head on the liquid ejection apparatus.

11. The liquid ejection apparatus according to claim 10, wherein a length of the rail portion of the liquid ejection head is equal to or shorter than a length from an end portion of the protection member in the first direction to the liquid ejection head mounting unit while the liquid ejection head is mounted on the liquid ejection head mounting unit.

* * * * *